O. E. SEYMOUR.
Journal, Stud, or Crank-Pin.
No. 163,892.  Patented June 1, 1875.
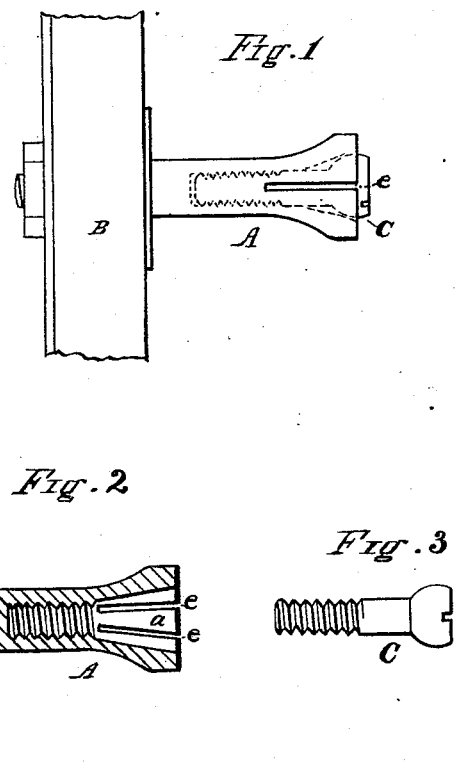
WITNESSES.
Frederick A. Herring.
H. Salisbury
INVENTOR.
Oliver E. Seymour.
By Gridley & Warner
(his Attys.)

UNITED STATES PATENT OFFICE.

OLIVER E. SEYMOUR, OF INDIANAPOLIS, INDIANA, ASSIGNOR TO FRANKLIN H. BROWN, OF SAME PLACE.

IMPROVEMENT IN JOURNAL-STUDS OR CRANK-PINS.

Specification forming part of Letters Patent No. 163,892, dated June 1, 1875; application filed March 25, 1875.

*To all whom it may concern:*

Be it known that I, OLIVER E. SEYMOUR, of Indianapolis, in county of Marion and State of Indiana, have invented a new, useful, and Improved Journal-Stud or Crank-Pin, of which the following is a full, clear, and exact description, which will enable others skilled in the art to which my invention appertains to make and use the same, reference being had to the accompanying drawing, forming a part hereof, and in which—

Figure 1 is a side elevation of my improved device; Fig. 2, a longitudinal section of a part thereof, and Fig. 3 a side elevation of the screw employed in connection therewith.

Like letters of reference indicate like parts.

My object is to so make a journal-stud or crank-pin that it may be readily and nicely fitted to the part operating in connection with it, and to the part to which it is to be attached, and so that it may be expanded with facility whenever the moving parts become perceptibly worn by use. By this means the device may be readily applied to any fixed part, and lost motion is prevented, and, as an incident of my invention, the parts may be kept well lubricated, all of which will hereinafter more fully appear.

In the drawing, A represents a crank-pin or stud, made in one piece, of metal, preferably somewhat flexible or spring-like. B is the part from which the pin projects. That end of the pin which enters the part B is screw-threaded, as shown, and enters a female screw in the said part. The male screw may be made long enough to project sufficiently beyond the part B to receive a nut, but a nut is not essential. In the outer end or head of this pin is sunken longitudinally a deep socket, preferably flaring, and terminating in a female screw, as shown at *a*. *e e* are deep slits or cuts, sunken longitudinally into the flaring part of the pin. C is a headed screw, constructed to enter the female screw above referred to. The head of this screw may be made in various forms, the object being to so construct it that the tongue formed by the slits *e e* will be bent or forced outwardly, and thus expanded by turning the screw into the part made to receive it.

It will be perceived, from the foregoing description, that the perimeter of a part of the pin may be considerably expanded in the manner described, and thus nicely and easily fitted to the connecting-rod or pitman operating in connection with it. By this means lost motion will be prevented, and this expansion may be made with facility whenever the parts become perceptibly worn. In case of too great expansion from frictional heat or otherwise, the screw may be withdrawn a little way. When the screw is withdrawn the head of the pin A will contract slightly. The socket in the pin will hold a considerable amount of lubricating oil, which will readily find its way through the slits *e e* to the bearing-surfaces. The pin may also be used with advantage to perform the function of a journal for a wheel, and for various analogous purposes.

I am aware that an expansible ball, made in sections, has heretofore been employed in connection with an expanding device for the purpose of preventing lost motion and compensating for the wear of parts which move on each other, and I do not claim such; but

Having thus described my invention, what I claim as new, and desire to secure by Letters Patent, is—

The expansible pin A, made in one piece, and terminating at one end in a male screw, and at the other in a flaring, recessed, and split head terminating in a female screw, in combination with the headed screw-pin C, all substantially as shown and described, and for the purposes set forth.

OLIVER E. SEYMOUR.

Witnesses:
FRANKLIN H. BROWN,
EDGAR A. BROWN.